March 29, 1966 J. F. PAULSEN 3,242,693
COUPLING DEVICES, IN PARTICULAR FOR SHAFTS
INTENDED TO TRANSMIT HIGH TORQUES
Filed Feb. 25, 1963 3 Sheets-Sheet 1

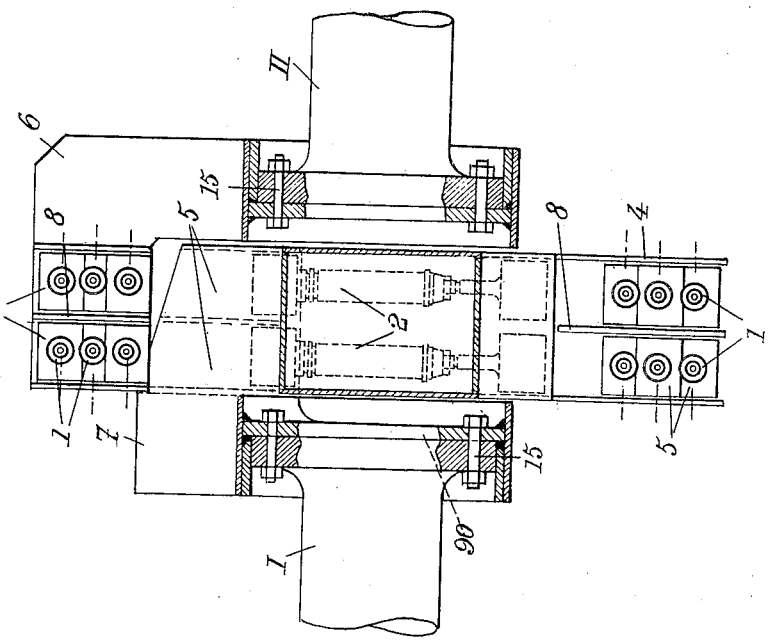
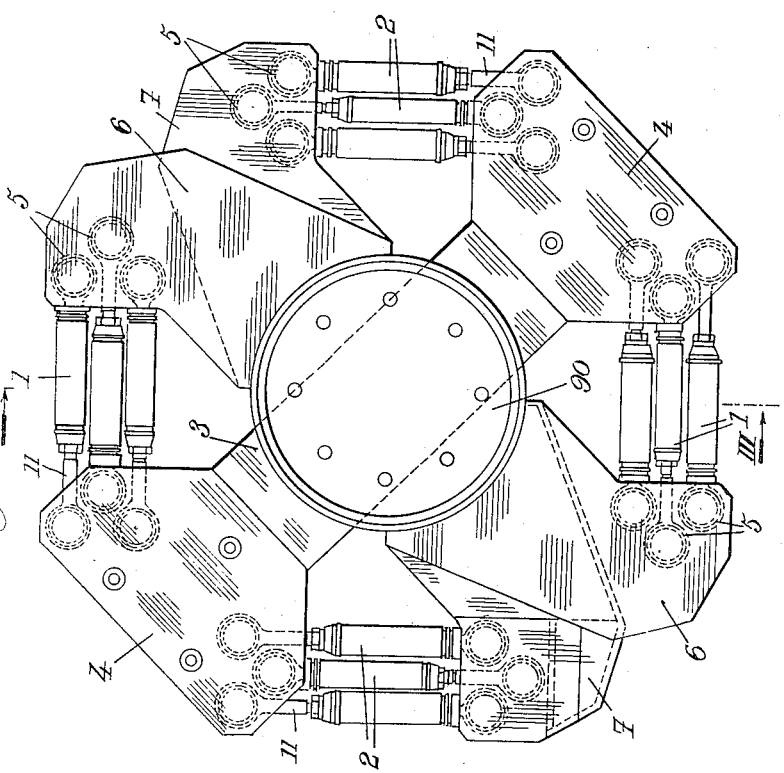

March 29, 1966 J. F. PAULSEN 3,242,693
COUPLING DEVICES, IN PARTICULAR FOR SHAFTS
INTENDED TO TRANSMIT HIGH TORQUES
Filed Feb. 25, 1963 3 Sheets-Sheet 3
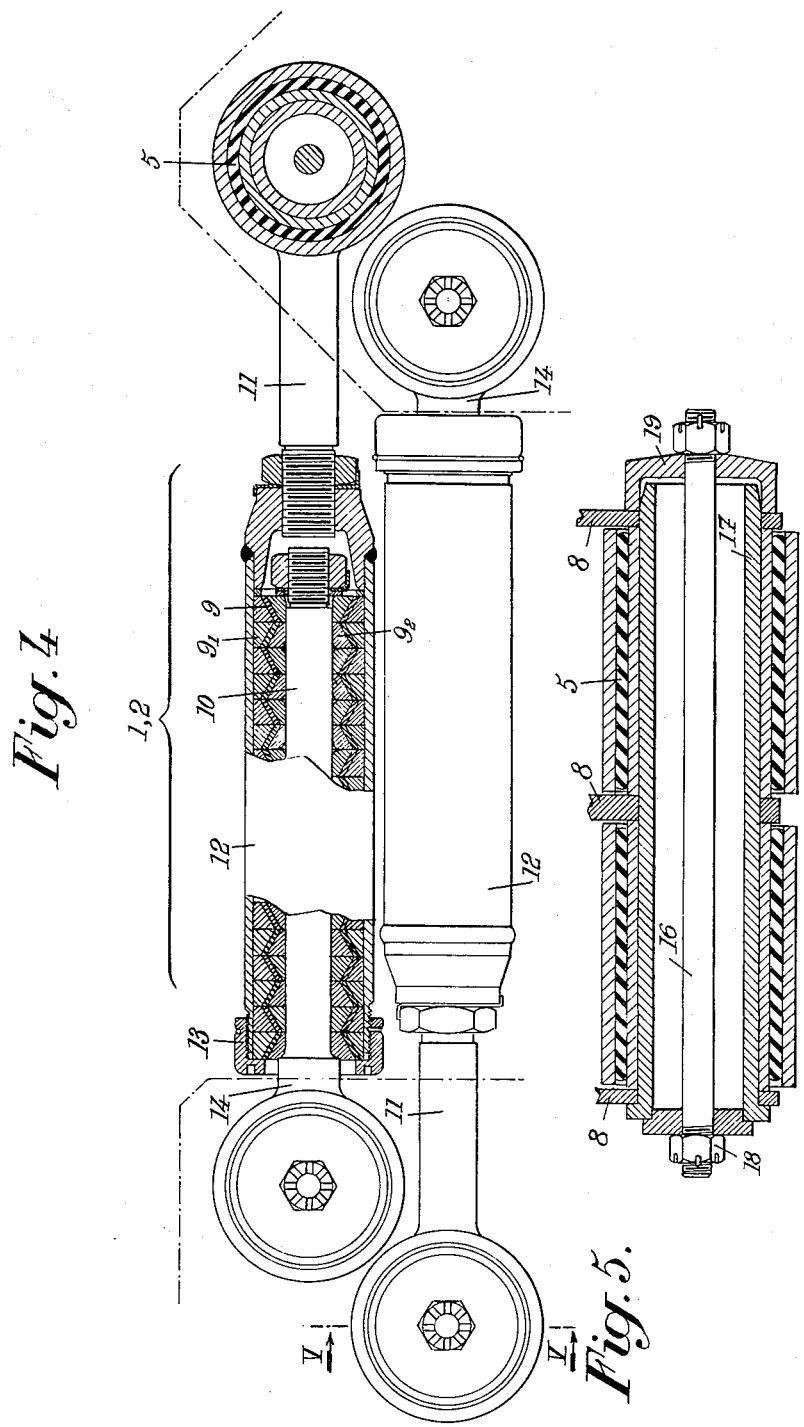

United States Patent Office 3,242,693
Patented Mar. 29, 1966

3,242,693
COUPLING DEVICES, IN PARTICULAR FOR SHAFTS INTENDED TO TRANSMIT HIGH TORQUES
Jean Felix Paulsen, Chateaudun, France, assignor to Societe Luxembourgeoise de Brevets et de Participations, Luxembourg
Filed Feb. 25, 1963, Ser. No. 260,365
Claims priority, application France, Feb. 24, 1962, 889,107
2 Claims. (Cl. 64—19)

The present invention relates to coupling devices and it is more especially, but not exclusively concerned, with coupling devices to be inserted between shafts transmitting high torques, as it is the case for the propeller shafts of ships.

The object of the present invention is to provide a device of this kind which is better adapted to meet the requirements of practice, in particular to absorb vibrations and to eliminate dangerous thrusts exerted on the bearings.

The invention relates to coupling devices forming a kind of Oldham joint.

According to my invention every connecting rod of such a system consists of a bundle of elementary connecting rods of smaller cross section, and every elementary connecting rods comprises two members fixed to the ends of said rod and telescopically movable with respect to each other, a series of frusto-conical rings secured to each of said members, every two successive rings of a series having opposed respective conicities and the frusto-conical surfaces of one series being parallel to those of the other series, respectively, and frusto-conical rings of a resilient material each interposed between two corresponding rings of said two series.

A preferred embodiment of the present invention will be hereinafter described with reference to the appended drawings, given merely by way of example, and in which:

FIG. 2 is a front view (that is to say a projection on a plane transverse to the rotation axis) of a coupling device made according to the present invention;

FIG. 3 is a longitudinal section on the line III—III of FIG. 2;

Figure 1:
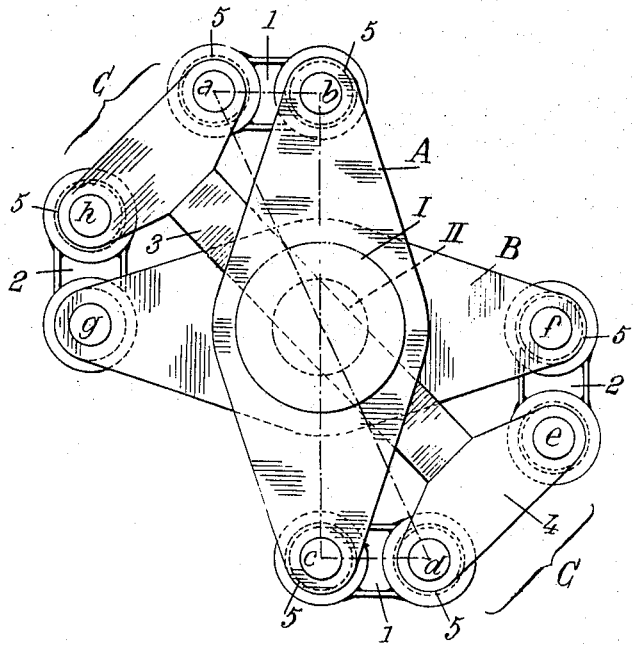
FIG. 1 shows a coupling device of the Oldham type to which the invention may be applied.

FIG. 4 separately shows, in elevational view on an enlarged scale, with portions in longitudinal section, the connecting rods of the device according to this invention;

FIG. 5 shows in section on the line V—V of FIG. 4 one of the pivot connections of one of the connecting rods.

In propelling systems for ships, it seems advantageous to provide, at the output of the engine and/or of the reducing gear associated therewith, a coupling device of the Oldham type.

An Oldham coupling is diagrammatically illustrated by FIG. 1 of the drawings.

The intermediate element, shown at C in the drawings, is connected through rods 1 and 2 with the two elements or crank arms A, B respectively carried by the ends of shafts I, II.

There are two connecting rods 1 of equal lengths and also two connecting rods 2 of equal lengths, the two connecting rods 1 and the two connecting rods 2 being disposed in antiparallelogram position and being substantially tangential to the general rotation, said rods being journalled about axes $a$, $b$, $c$, $d$ and $e$, $f$, $g$, $h$ parallel to the common direction of shafts I and II.

However, it is of interest, in order substantially to reduce the reactions, to use instead of every connecting rod, a $n$ plurality of connecting rods 1 or 2, substantially parallel to one another and each comprising resilient articulations of relatively small dimensions i.e. relatively flexible torsionally and conically. As a matter of fact, in order to calculate these articulations, it must be noted that for given tangential stresses, the sum of their projected areas must remain of the same order of magnitude as the projected area of the elementary single articulation. The torsional and conical rigidities will be, for the whole of the connecting rods, substantially reduced with respect to the single conical rod.

It is interesting to group as much as possible these multiple connecting rods to form sheets each located in a radial plane and the articulations of which, visible at 5 on FIGS. 2 and 3, are advantageously disposed in staggered arrangement so as to reduce the space occupied as much as possible, said sheets of connecting rods being possibly either used separately, or grouped in parallel by superposing several sheets in the axial direction, for instance $p$ sheets of $m$ connecting rods ($n=pm$), as shown, in which case a single axis of articulation may be common to the homologous connecting rods of the successive sheets.

As shown by FIGS. 2 and 3, crank arms 6, 7, which correspond in these views to the elements A and B of FIG. 1, may comprise wall elements 8 provided with holes in which are engaged the axes of resilient articulations 5, which axes are kept in position through any suitable means such as bolts, nuts or the like. A single axis may therefore easily support resilient sleeves corresponding to the $p$ sheets, respectively.

Every crank plate 6 or 7 is for instance secured through a disc 90 to a corresponding fixation flange provided at the end of the corresponding shaft II or I, by means of bolts 15 extending in the axial direction.

Similarly the head 4 of floating element 3 is provided with similar walls 8.

Such bundles of connecting rods arranged as above stated comply with the above mentioned conditions. The flexibility of the whole of the resilient articulations is much higher than in the case of single connecting rods so that it becomes possible to limit to moderate values the radial return stresses and the conical return torques applied to the bearings and to the shafts by said articulations in case of permanent or accidental misalinement of shafts.

However, it should be noted that the working of the Watt parallelogram is theoretically non compatible with the articulation of more than one connecting rod for every sheet so that secondary radial stresses occur on the articulations. Now the radial resiliency of rubber might, in some cases, be insufficient for supporting said stresses.

It is therefore of interest, according to another feature of the invention, to reduce these secondary radial stresses by arranging the connecting rods in such manner that they have some longitudinal resiliency.

In order to obtain this longitudinal resiliency, use is made, for instance, of the combined shearing work (shearing and pulling or shearing and compressing) of several annular elements of general frusto-conical shape, made of rubber or an elastomer, disposed along the axis of every connecting rod.

These frusto-conical rings, shown at 9 in FIG. 4, are for instance made adherent each to two metal rings $9_1$, $9_2$, the blocks thus formed being juxtaposed along the axis of the connecting rod, advantageously in such manner that two successive blocks have conical elements 9 of respective opposed conicities.

These blocks 9, $9_1$, $9_2$ are therefore interposed between, on the one hand, a central rod 10 rigid with one of the ends 14 of the connecting rod and, on the other hand, an external cylindrical body 12 provided with a cap 13 and secured to the other end 11 of the connecting rod.

Advantageously, the various connecting rods forming the same sheet may be given different resiliencies. This arrangement, obtained for instance by the choice of different mixtures of elastomers for making said blocks, will be advantageously used in such manner that the total longitudinal resiliencies of the connecting rods (including the portion due to the radial resiliencies of the two articulations) are proportional to the radius of mounting of said connecting rods in the coupling device. Thus, the longitudinal effort due to the torque that is transmitted will be made equal for all the connecting rods, whatever be their location.

It should be well understood that the longitudinal resiliency might be obtained through other means, for instance by the action of springs or again by means of resilient elements working in a manner different from that resulting from the above described embodiment.

FIG. 5 shows the mounting of elastic sleeves 5. It will be seen that rods 16, which form the articulation axes, are made rigid with sleeves 17, by means of bolts and nuts, or the like, 18, 19 ensuring fixation to walls 8. It is on these sleeves, the diameter of which is calculated in accordance with the projected area to be adopted for elastic masses 5, that said masses are mounted, being made adherent by the usual means to metallic sleeves opposite to each other.

A system as above described has, in particular, the following advantages:

It permits of suitably choosing the resiliencies in different respective directions, And chiefly, while keeping at a moderate value the strains in the resilient articulations despite the important torques to be transmitted, it permits of accepting important misalinements, either accidental or permanent, without producing excessive loads on the shaft bearings nor important bending moments between movements on the shafts themselves, and this due to the increased flexibility of the whole of said articulations obtained by the provision of multiple connecting rods.

Such coupling devices are therefore particularly interesting when applied to ship power plant transmissions and they permit of avoiding the breaking of gears. But of course they might be applied to other kinds of coupling device.

In a general manner, while the above description discloses what is deemed to be a practical and efficient embodiment of the invention, said invention is not limited thereto as there might be changes made in the arrangement, disposition and form of the parts without departing from the principle of the invention as comprehended within the scope of the appended claims.

What I claim is:

1. In a device of the Oldham type for coupling together a driving shaft and a driven shaft mounted to have substantial radial, angular and axial displacements relatively to each other and comprising two crank arms rigid with the respective adjacent ends of said shafts, an intermediate member and link means between said intermediate member and said crank arms, respectively, said link means being at right angles to each other and symmetrically disposed, the arrangement according to which each of said link means consists of a plurality of substantially parallel connecting rods, of equal respective lengths, with resilient material swivels between each end of each of said connecting rods and on the one hand said intermediate member and on the other hand the corresponding crank arm, every connecting rod comprising two members fixed to the ends of said rod and telescopically movable with respect to each other, a series of frusto-conical rings secured to each of said members, every two successive rings of a series having opposed respective conicities and the frusto-conical surfaces of one series being parallel to those of the other series, respectively, and frusto-conical rings of a resilient material each interposed between two corresponding rings of said two series.

2. In a device of the Oldham type for coupling together a driving shaft and a driven shaft mounted to have substantial radial, angular and axial displacements relatively to each other and comprising two crank arms rigid with the respective adjacent ends of said shafts, an intermediate member and link means between said intermediate member and said crank arms, respectively, said link means being at right angles to each other and symmetrically disposed, the arrangement according to which each of said link means consists of a plurality of substantially parallel connecting rods, of equal respective lengths, with resilient material swivels between each end of each of said connecting rods and on the one hand said intermediate member and on the other hand the corresponding crank arm, every connecting rod comprising two coaxial elongated members one of which is tubular and surrounds the other, said elongated members being rigidly fixed to the opposed ends of said connecting rod, a series of frusto-conical ring secured to each of said two members and transverse to the longitudinal direction thereof, every two successive rings of each series having opposed conicities and every ring of one series being located opposite a ring of the other series, respectively, with the conical surfaces of said two last mentioned rings at least substantially parallel to each other and frusto-conical rings of a resilient material each adherent on its opposed faces, respectively, to the two respective conical facing surfaces of two rings located opposite each other and belonging to said two series, respectively.

References Cited by the Examiner

UNITED STATES PATENTS

| 587,019 | 7/1897 | Sperry | 64—19 |
| 1,112,219 | 9/1914 | Kennedy | 64—19 |
| 2,380,672 | 7/1945 | Opitz | 64—12 |
| 2,910,844 | 11/1959 | Chapman | 64—19 |

FOREIGN PATENTS

| 745,135 | 2/1933 | France. |
| 377,817 | 8/1932 | Great Britain. |

BROUGHTON G. DURHAM, *Primary Examiner.*

ROBERT C. RIORDON, *Examiner.*

H. C. COE, *Assistant Examiner.*